(12) United States Patent
Kathpal et al.

(10) Patent No.: US 10,613,944 B2
(45) Date of Patent: Apr. 7, 2020

(54) SYSTEMS AND METHODS FOR BACKUP AND RESTORE OF DISTRIBUTED MASTER-SLAVE DATABASE CLUSTERS

(71) Applicant: NETPP, INC., Sunnyvale, CA (US)

(72) Inventors: Atish Kathpal, Bangalore (IN); Priya Sehgal, Pune (IN)

(73) Assignee: NETAPP, INC., Sunnyvale, CA (US)

( * ) Notice: Subject to any disclaimer, the term of this patent is extended or adjusted under 35 U.S.C. 154(b) by 387 days.

(21) Appl. No.: 15/490,201

(22) Filed: Apr. 18, 2017

(65) Prior Publication Data

US 2018/0300203 A1    Oct. 18, 2018

(51) Int. Cl.
*G06F 11/14*    (2006.01)
*G06F 16/27*    (2019.01)

(52) U.S. Cl.
CPC ...... *G06F 11/1464* (2013.01); *G06F 11/1469* (2013.01); *G06F 16/278* (2019.01); *G06F 2201/80* (2013.01); *G06F 2201/84* (2013.01)

(58) Field of Classification Search
None
See application file for complete search history.

(56) References Cited

U.S. PATENT DOCUMENTS

| 9,697,268 | B1 * | 7/2017 | Prater | G06F 16/27 |
| 10,025,673 | B1 * | 7/2018 | Maccanti | G06F 11/1458 |
| 2013/0262387 | A1 * | 10/2013 | Varadharajan | G06F 11/3664 |
| | | | | 707/639 |

* cited by examiner

*Primary Examiner* — Robert W Beausoliel, Jr.
*Assistant Examiner* — Hau Hoang
(74) *Attorney, Agent, or Firm* — Klein, O'Neil & Singh, LLP

(57) ABSTRACT

Methods and systems for a distributed database cluster are provided. One method for the distributed database cluster having a plurality of logical partitions, where each partition is used to store a plurality of replicas for a database, and each of the plurality of replicas are managed by one of a plurality of nodes includes preventing any topology change in the distributed database cluster; capturing a topology of the distributed database cluster prior to a first backup phase of a backup operation; generating a snapshot of all logical objects used by all active nodes to store the plurality of replicas of the database; initiating a second phase of the backup operation at a recovery node using the backup topology metadata after the first phase of the backup operation; and cloning snapshots of the logical objects from the first phase of the backup operation.

20 Claims, 15 Drawing Sheets

_US 10,613,944 B2_

SYSTEMS AND METHODS FOR BACKUP AND RESTORE OF DISTRIBUTED MASTER-SLAVE DATABASE CLUSTERS

TECHNICAL FIELD

The present disclosure relates to networked storage environments and more particularly, to backup and restore of distributed, master-slave database clusters.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

NoSQL databases may have various replicas that are maintained by various computing nodes in a cluster. The data files and logs, including journal and operation logs are stored at shared storage systems that are managed by the storage operating system. Backing up distributed databases is challenging because of the number of computing nodes and clients that access distributed databases at any given time. Continuous efforts are being made to efficiently backup and restore distributed databases stored at a plurality of cluster nodes.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures:

FIG. 1I shows an example of completing Phase 2 of the backup operation when a primary node database copy is corrupted;

DETAILED DESCRIPTION

Figure 1A:
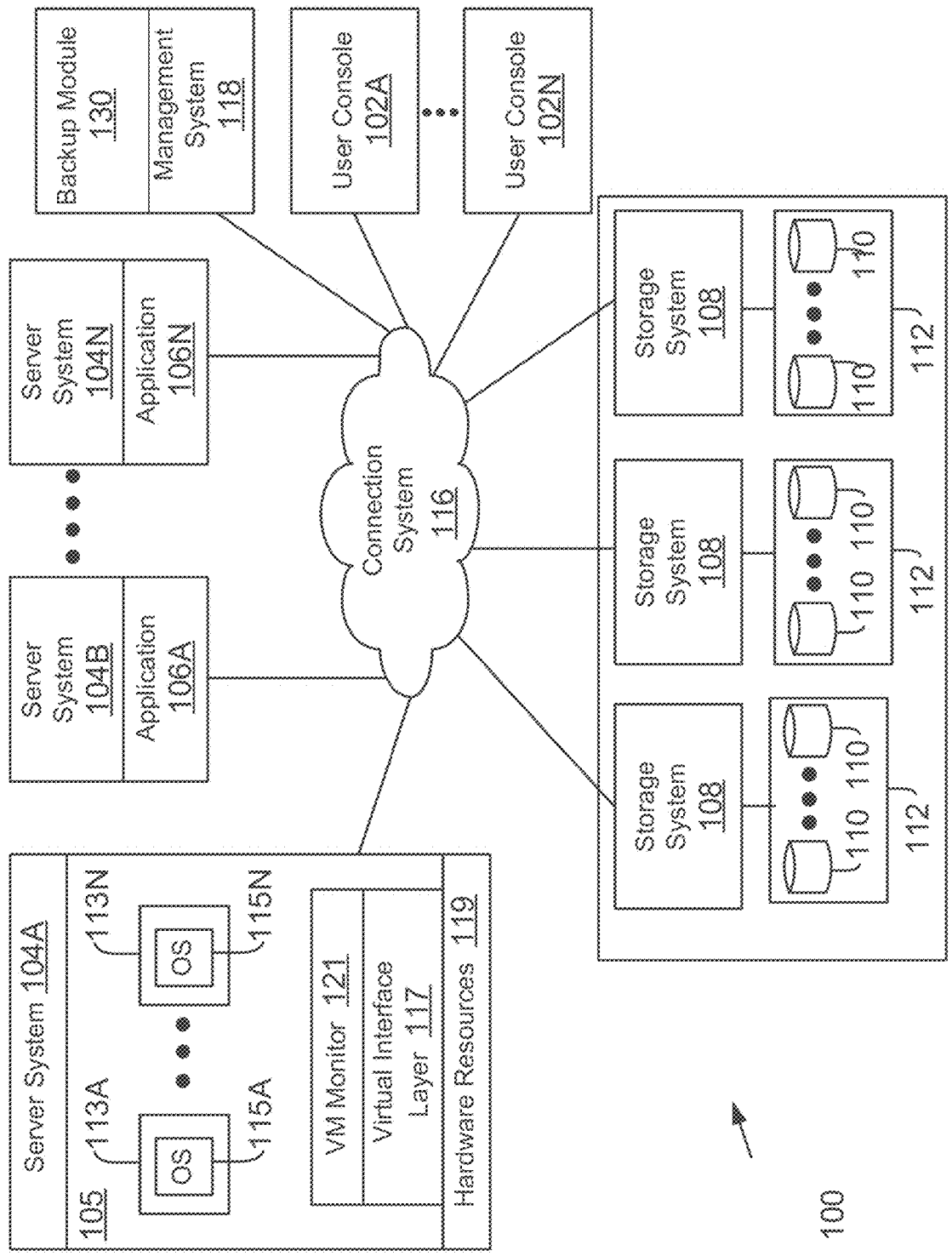
FIG. 1A shows an example of an operating environment for the various aspects disclosed herein.

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, methods and systems for protecting NoSQL databases in a distributed, master-slave cluster using innovative backup technology of the present disclosure are provided. A NoSQL database is different from a SQL (structured query language) relational database that is based on tabular relations. A NoSQL database uses different data structures compared t0 SQL databases, for example, key-value pairs (including for example, JSON (Java Script Object Notation) based objects) and others making them more efficient.

NoSQL databases maybe managed in a clustered environment where numerous computing nodes manage a replica or copy of the database using shared storage. The distributed database environment may have a master-slave architecture or a master-less architecture, as described below in detail. Examples of master-slave database applications include the "MongoDB", Oracle NoSQL, MarkLogic, Redis and other similar database applications (without derogation of any third party trademark rights). The examples below are based on MongoDB, a NoSQL database program/application that uses JSON (Java Script Object Notation) like objects to store data in a MongoDB database, however, the various adaptive described herein are not limited to any specific database type.

In the master-slave environment, replication is a process of synchronizing data across multiple database nodes (or servers). Replication provides redundancy and increases data availability with multiple copies of data on different database servers/nodes. As an example, a replica set for a distributed NoSQL database includes multiple instances of the database/database program. In a replica set, a primary copy is managed by a primary computing node (maybe referred to as a primary server or primary node) and secondary replicas are managed by secondary computing nodes (maybe referred to as secondary nodes or secondary servers). Each node executes an instance of the database program.

The primary node operates as a "master" to store data and metadata for the database. All database write operations and updates flow through the primary node. The database replicas (i.e. the primary and at least one secondary copy) are organized within a shard, where a shard is a "horizontal partition" of the database and managed as a logical structure. Each shard maybe held on a separate database server instance, to distribute the load for storing and retrieving data.

A database program may provide built-in backup options but they do not address snapshots (i.e. point in time copies described below in detail). The database programs do not provide an efficient way for handling data corruption that can propagate to disaster recovery copies, accidental deletion, security breaches, and/or catastrophic failures.

There are also various challenges for backing up and restoring distributed NoSQL databases. Crash-consistent backups that typically capture an image of data at a given time are not sufficient for distributed database applications because they are not cluster consistent and may not capture all the data in a cache of a database node or any pending I/O operations.

A cluster consistent backup for a distributed database is a backup that is in a cluster consistent state. The cluster consistent state ensures that data across multiple nodes meets consistency requirements that are set by a database application. For example, if the database application configures that data writes have to be replicated across 3 nodes, then a write operation is considered successful only when data is replicated by at least 3 nodes (i.e. quorum nodes). It is difficult to provide cluster consistent backups without having the cluster nodes interface with each other to remove inconsistencies. The inter-node communication to remove inconsistencies consumes network and computing resources and hence is inefficient.

It is also desirable to backup the distributed database without having to quiesce the database application. The term quiesce as used herein describes a state in which a database application cannot accept client read and write requests.

It is also difficult to ensure a backup operation has succeeded even when some of the nodes are not available. Furthermore, with numerous shards and replicas, one has to store backups in a space efficient manner to optimally use shared storage space.

In one aspect, innovative backup/restore technology is provided for a master-slave, NoSQL distributed database cluster where crash consistent backups are transformed to cluster consistent state without inter-cluster node communication to remove inconsistencies or having to quiesce read/write requests from client applications. Details regarding the innovative backup technology are provided below.

System 100:

FIG. 1A shows an example of a networked operating environment 100 (also referred to as system 100), for implementing the various adaptive aspects of the present disclosure. In one aspect, system 100 may include a plurality of computing systems 104A-104N (may also be referred to and shown as server system 104 or as host system 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles 102A-102N (may be referred to as user 102 or client system 102).

Server systems 104 may be computing devices configured to execute applications 106A-106N (referred to as application 106 or applications 106) over a variety of operating systems, including the UNIX® and Microsoft Windows® operating systems. Applications 106 may utilize data services of storage system 108 to access, store, and manage data in a set of storage devices 110 that are described below in detail. Applications 106 may include a database program that is executed in a master-slave distributed database cluster, as described below in detail.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104A may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 113A-113N. VMs 113A-113N execute a plurality of guest OS 115A-115N (may also be referred to as guest OS 115) that share hardware resources 119. As described above, hardware resources 119 may include CPU, memory, I/O devices, storage or any other hardware resource.

A virtual machine monitor (VMM) 121, for example, a processor executed hypervisor layer provided by VMWare Inc., Hyper-V layer provided by Microsoft Corporation (without derogation of any third party trademark rights) or any other layer type, presents and manages the plurality of guest OS 115A-115N. VMM 121 may include or interface with a virtualization layer (VIL) 117 that provides one or more virtualized hardware resource 119 to each guest OS. For example, VIL 117 presents physical storage at storage devices 110 as virtual storage (for example, as a virtual hard drive (VHD)) to VMs 113A-113N. The VMs use the VHDs to store information at storage devices 110.

In one aspect, VMM 121 is executed by server system 104A with VMs 113A-113N. In another aspect, VMM 121 may be executed by an independent stand-alone computing system, often referred to as a hypervisor server or VMM server and VMs 113A-113N are presented via another computing system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may include one or more computing systems for performing various tasks described below in detail. Management system 118 may also execute or include a backup module 138 that executes the process blocks using the innovative backup technology described below in detail.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 121 as a storage volume or one or more qtree sub-volume units including logical unit numbers (LUNs). Each storage volume may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 113A-113N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104

In one aspect, storage system 108 may have a distributed architecture, for example, a cluster based system that may include a separate network module and storage module, described below in detail with respect to FIG. 2A. Briefly, the network module is used to communicate with host platform server system 104 and management system 118, while the storage module is used to communicate with the storage devices 110 that are a part of a storage sub-system.

Figure 1B:
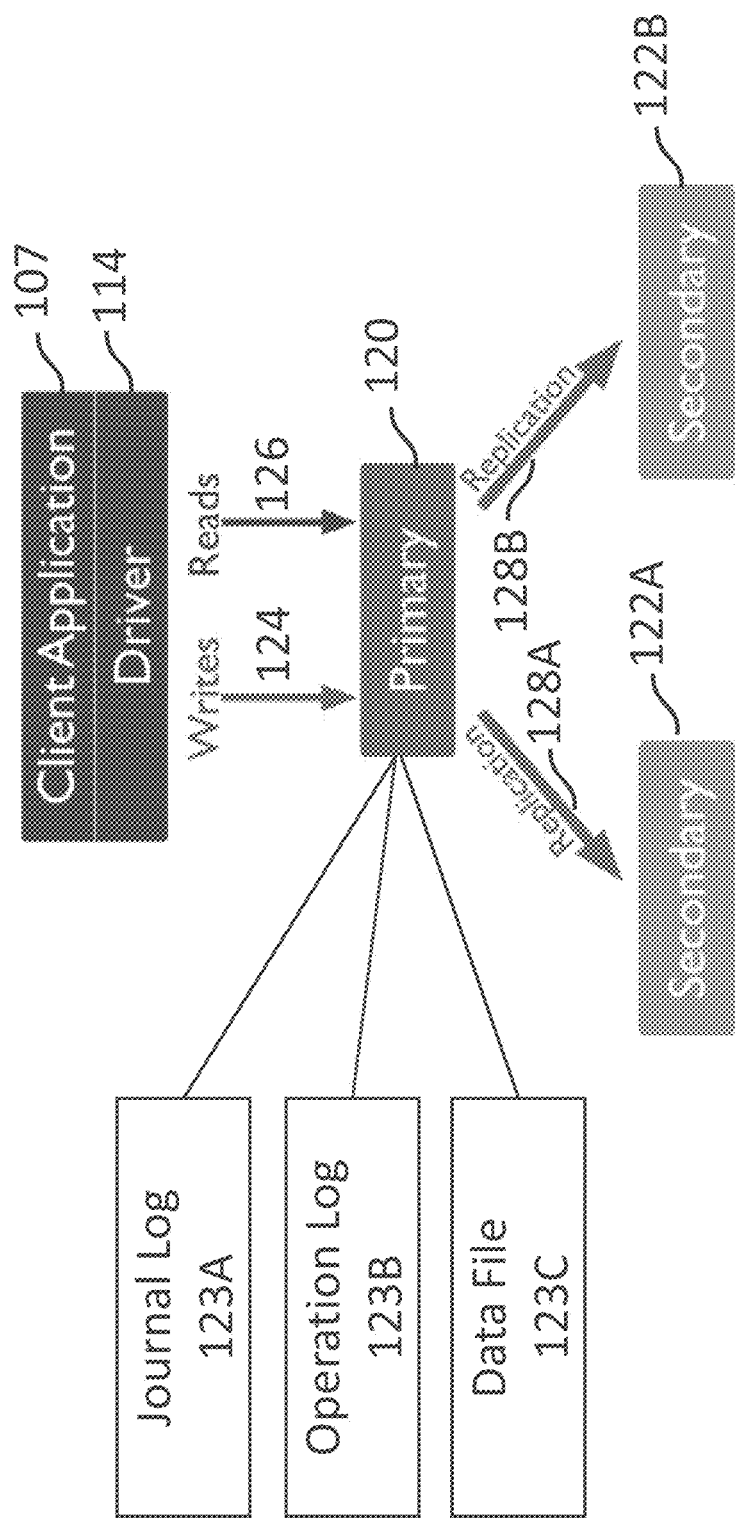
FIG. 1B shows an example of a master-slave distributed database environment, according to one aspect of the present disclosure.

Master-Slave Database Cluster:

FIG. 1B shows a block diagram illustrating a master-slave database cluster environment, for example, a cluster executing a MongoDB. A client application 107 executed by a computing device (for example, user console 102A) generates write requests 124 and read requests 126. The write requests 124 and the read requests 125 are transmitted by a driver 114 executed by the user console 102A to a primary computing node 120 that executes an instance of the database application (e.g. 106). The data received from the client application 107 is replicated (shown as 128A/128B) to secondary nodes 122A/122B that each execute independent instance of the database program. The primary node 120, the secondary nodes 122A/122B comprise a "replica" of a clustered, distributed database. The primary and secondary nodes are also part of a same "shard" that is uniquely identified and maybe executed by separate servers (e.g. 104)/VMs.

When a write request is received, a journal log (123A) entry is first entered. The journal log 123A is typically stored in persistent storage. The journal log 123A includes an address of where data is to be written. An operation log 123B is maintained at a cache (not shown) of the primary node 120. The operation log 123B includes details of each operation and the status of each operation. The data file 123C for a write request is also initially stored at the cache of the primary node 120. The cache that stores the operation log 123B and the data file 123C is periodically flushed to persistent storage (e.g. 110, FIG. 1A) after a certain duration (e.g. 60 seconds) or when the cache has reached a certain capacity level. The journal log 123A is typically replayed to restore a system after crash. In the adaptive technology described herein, the journal log 123A may be used to reconcile a backup operation to transform a crash consistent backup to a cluster consistent backup, as described below in detail.

Figure 1C:
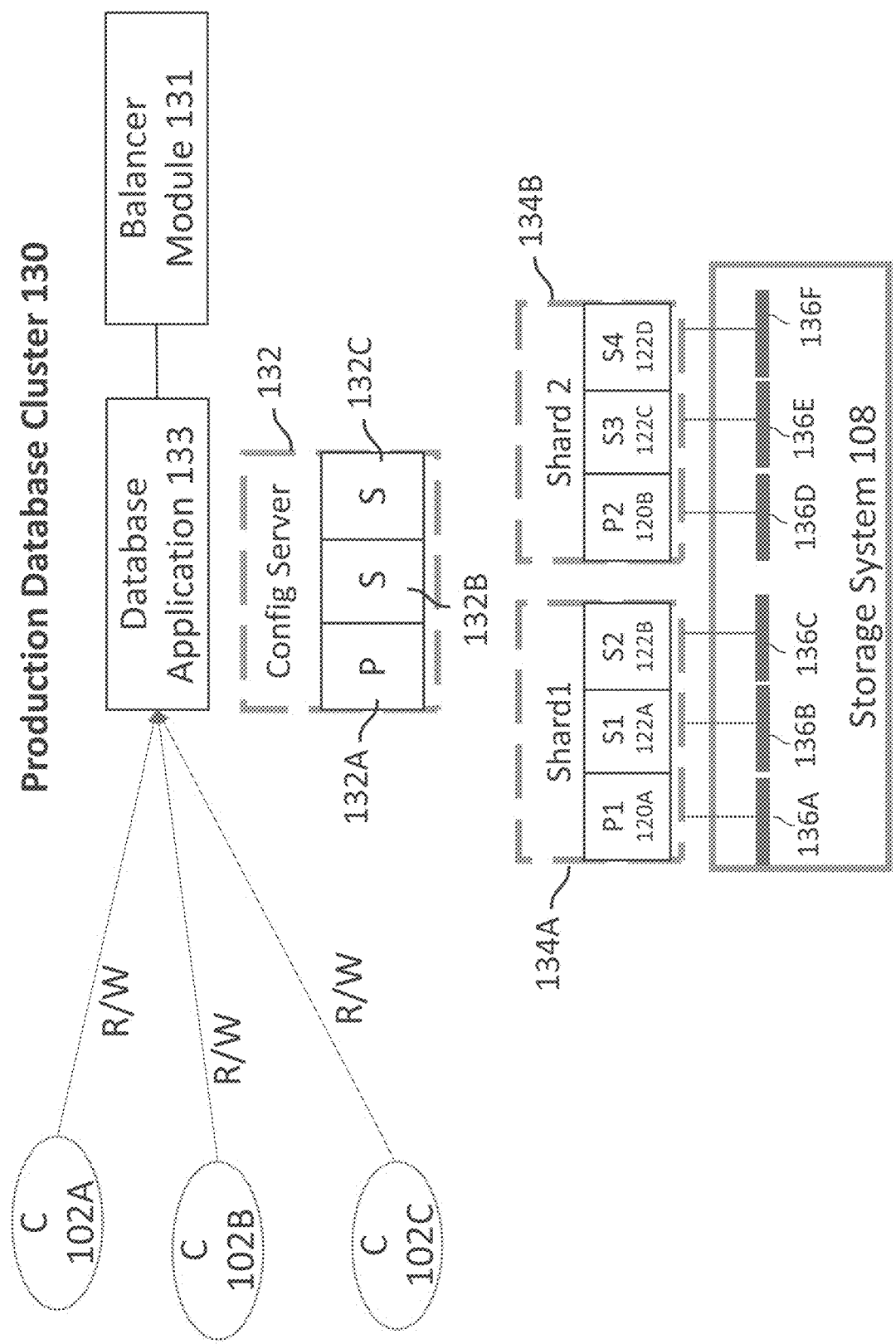
FIG. 1C shows an example of a master-slave distributed database cluster, used according to one aspect of the present disclosure.

Master-Slave Cluster 130:

FIG. 1C shows an example of a distributed, production database cluster 130 (maybe referred to as cluster 130) for example, a MongoDB cluster, according to one aspect of the present disclosure. The term production as used herein means that the database is actively used by client applications to read and write data. Cluster 130 executes a database application/program 133 (similar to application 106) that receives read and write requests from clients' 102A-102C to store data to, and retrieve data from, at least one database.

Cluster 130 includes a balancer module 131 that is either part of the database application 133 or interfaces with the database application 133. The balancer module 131 is executed as a background process and is responsible for balancing database contents across shards or partitions for various cluster nodes.

Cluster 130 includes one or more configuration servers 132 (shown as "Config Server" 132) that stores metadata for the cluster 130 having a plurality of shards, e.g., 134A-134B. The metadata reflects the state and organization of data and the various components within the cluster. The metadata includes a list of "chunks" on every shard and the address ranges that define the chunks. The term chunk means a finite amount of storage space. The various instances of database application 133 cache the metadata data and use the metadata to route read and write operations to the correct shards. The configuration information is updated when there are metadata changes for the cluster, such as adding a shard. The configuration server 132 also store authentication configuration information such as Role-Based Access Control (RBAC) or internal authentication settings for the cluster 130. The configuration server 132 may also be used to manage distributed locks.

Configuration server 132 stores multiple copies of the cluster metadata using multiple nodes 132A-132C, where node 132A operates as a primary node, while nodes 132B and 132C maintain secondary replicas of the metadata.

As an example, cluster 130 uses a first shard (Shard 1) 134A (maybe referred to as Shard 134A) and a second shard Shard 2) 134B (maybe referred to as Shard 134B) to store multiple copies of a database. It is noteworthy that the various aspects of the present disclosure are not limited to any specific number of shards.

Shard 1 134A maintains a primary copy of the database that is maintained by a primary node P1 120A, while secondary database replicas are maintained by secondary nodes, S1 122A and S2 122, respectively. Similarly, Shard 2 134B uses a primary node, P2 120B and secondary nodes, S3 122C and S4 122D for executing multiple instances of the database application 133 and storing multiple copies of the databases within cluster 130. Each primary and secondary node is a computing device or a VM that executes an instance of database application 133 within cluster 130.

Each node is assigned to a LUN (shown as 136A-136F) within the shared storage system 108. The LUNs are used to store database replicas for each database node. Details for backing up multiple replicas of various databases within cluster 130 without having to quiesce client applications as well as database application 133 are provided below.

Figure 1D:
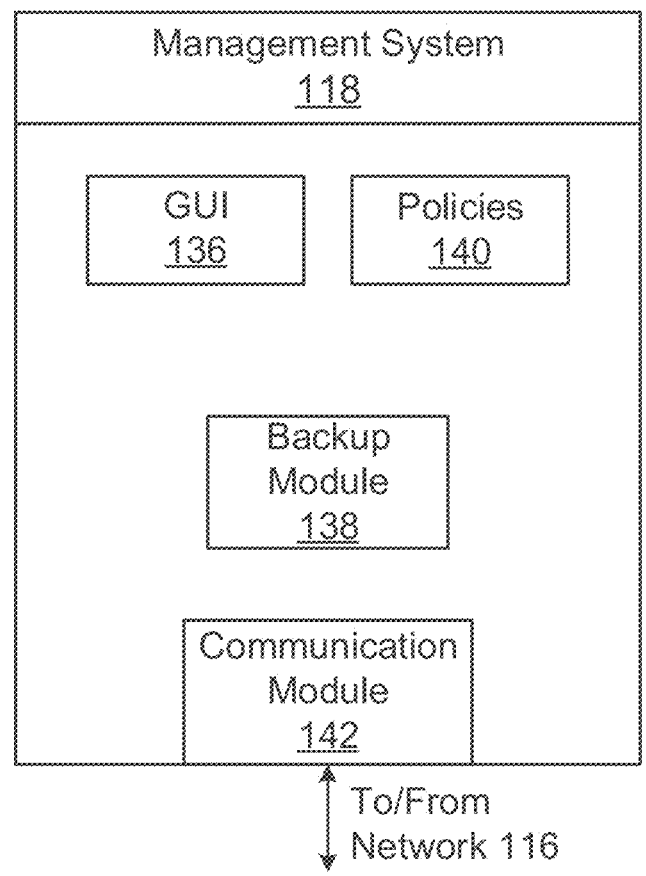
FIG. 1D shows a block diagram of a management system with a backup module of the present disclosure.

Management System 118:

FIG. 1D shows a block diagram of management system 118 with backup module 138, according to one aspect of the present disclosure. The various modules of management system 118 may be implemented in one computing system or in a distributed environment among multiple computing systems. For example, the backup module 138 maybe executed by a standalone server and/or VM.

In the illustrated aspect, the management system 118 may include a graphical user interface (GUI) module 136 to generate a GUI for use by a user. In another aspect, management system 118 may present a command line interface (CLI) to a user. The GUI may be used to receive requests to setup backup policies 140 based on which, the backup module 138 executes backup and/or restore operations.

Management system 118 may also include a communication module 142 that implements one or more conventional network communication protocols and/or APIs to enable the various modules of management system 118 to communicate with the various computing nodes of cluster 130 (FIG. 1C), storage system 108, VMs 113A-113N, server system 104 and clients 102.

Management system 118 may also include other modules that are not described in detail because the details are not germane to the inventive aspects of this disclosure.

Figure 1E:
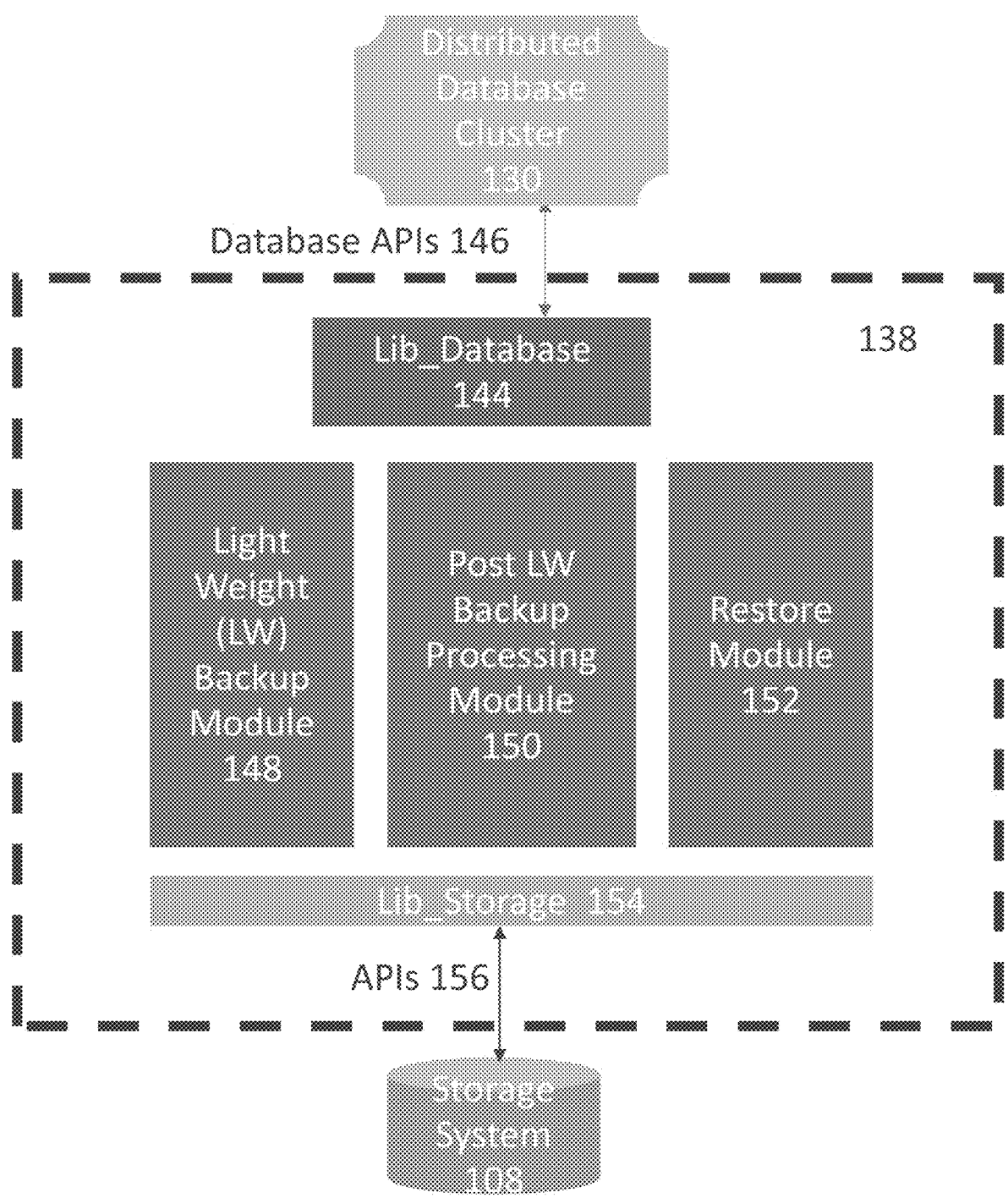
FIG. 1E is a block diagram of the backup module according to one aspect of the present disclosure.

Backup Module 138:

FIG. 1E provides an example of the backup module 138 interfacing with cluster 130 and the storage system 108, according to one aspect of the present disclosure. In one aspect, the backup module 138 includes a light weight (LW) backup module 148 (maybe referred to as module 148), a post LW backup processing module 150 (maybe referred to as module 150) and a restore module 152. Module 148 executes Phase 1 of a backup operation, while module 150 executes Phase 2 of the backup operation, as described below. The restore module 152 executes a restore process, as described below in detail.

The various modules communicate with cluster 130 via database application program interfaces (APIs) 146 provided by database libraries 144 (shown as Lib_Database 144). The structure/schema of the database APIs 146 depends on the type of database. For example, MongoDB will use one set of APIs, while Oracle NoSQL may use other APIs that are stored at Lib_Database 144. The adaptive aspects of the present disclosure are not limited to any specific API type or format.

A storage library 154 (shown as Lib_Storage 154) stores APIs 156 that are used to communicate with the storage system 108. APIs 156 will also depend on the storage system type. For example, Zephyr APIs (ZAPIs) may be used for a cluster based storage system provided by NetApp Inc. (without derogation of any trademark rights). REST based APIs may be used for cloud based storage systems (e.g. SolidFire provided by NetApp Inc. (without derogation of any trademark rights)). REST means "Representational State Transfer", which is a scalable system used for building web services. REST based systems/interface may use HTTP (hyper-text transfer protocol) or other communication protocols for communication. The various aspects of the innovative backup and restore technology disclosed herein are not limited to any specific API format.

Backup Operation Process Flows:

In one aspect, innovative, backup computing technology is disclosed for a distributed, master-slave, database cluster 130. The technology comprises of two backup phases. Phase 1 takes a crash consistent backup of various LUNs that are associated with the various replicas of the distributed database. Phase 1 is performed without quiescing the database application, i.e. the database application 133 continues to receive I/O (input/output) requests from client applications. Phase 2 performs background processing of the Phase 1 crash consistent backup and transforms the Phase 1 backup from a crash consistent state to cluster consistent state, according to one aspect of the present disclosure.

Figure 1F:
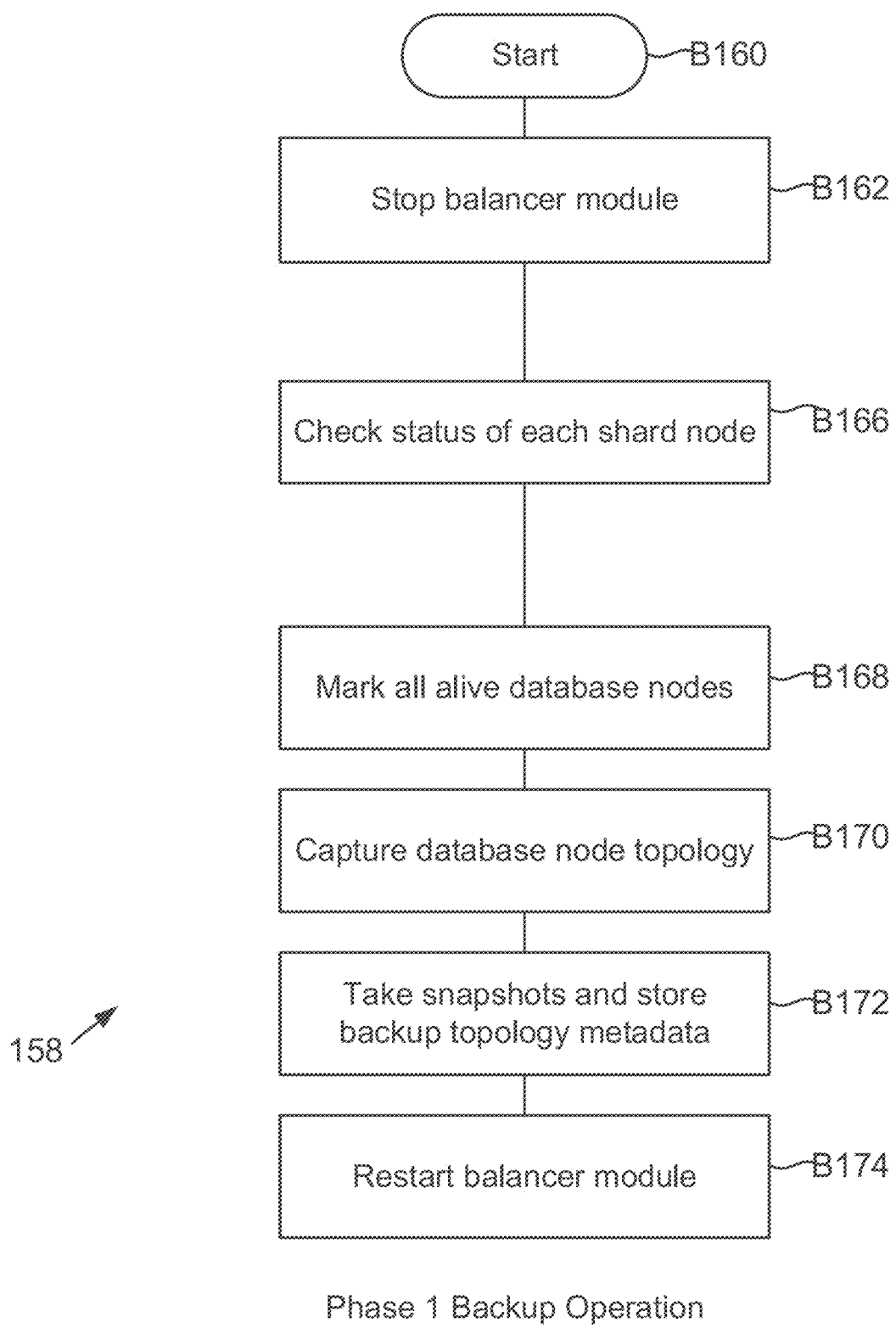
FIG. 1F shows a process flow diagram for Phase 1 of a backup operation, according to one aspect of the present disclosure.

Phase 1:

FIG. 1F shows a process flow 158 for Phase 1 of the backup operation, according to one aspect of the present disclosure. The various process steps are executed by the backup module 138 in conjunction with the storage system 108. The process begins in block B160 when database cluster 130 is operational and is responding to client read and write requests. The configuration server 132 is also operational.

In block B162, the LW backup module 138 requests the balancer module 131 (FIG. 1C) to stop load balancing between primary and secondary nodes for the operational shards (e.g. 134A and 134B, FIG. 1C) in the cluster 130. The request maybe sent using one or more APIs 146.

In block B166, the LW backup module 148 checks the status of each shard node, for example, 120A-120B and 122A-122D (as shown in FIG. 1C). The LW backup module 148 may send a message to configuration server 132 using one or more APIs 146 to obtain the node status. In one aspect, the configuration server 132 provides the status of each shard node whether the shard nodes are active or unavailable.

In block B168, the LW backup module 148 marks all cluster nodes that are "alive" i.e. operational. The LW backup module 148 may maintain a temporary data structure (not shown) to track the alive nodes as part of Phase 1 of the backup operation.

In block B170, the LW backup module 148 captures the existing cluster topology. The LW backup module 148 captures the mapping between shards and nodes, the nodes and the LUNs of the storage system 108, file system for each LUN and the database details (e.g. a database name, version, health of the various nodes or any other details). For example, with reference to FIG. 1H, assume that node 120B for shard 134B is off-line. Then the database cluster 130 topology maybe represented as: [CS (Configuration Server 132): P 132A, S132B; S132C; Shard 1 134A: P1 120A, S1 122A, S2 122B] and Shard 2 134B; [S2, 122C, S4 122D].

In block B172, the LW backup module 148 takes snapshots for each of the nodes including all the alive nodes of the configuration server 132. A snapshot is a "point in time" copy of the active file system that uses the storage LUNs for storing data on behalf of the database cluster nodes. The snapshot is a persistent point in time (PPT) image that enables quick recovery of data. The metadata for the snapshots is stored with the snapshots at a storage location so that it is accessible to module 150 and the restore module 152, as described below. The metadata includes a backup identifier, for example, a backup name, and list of databases that are excluded from the backup, a database cluster name, identifiers that identify the shards, an identifier that identifies the database cluster nodes (for example, the host system) that use an associated LUN, a health indicator indicating the health of the shard node at the time of the backup, LUN identifier identifying the LUN used by the node, and snapshot identifier identifying the snapshot of the LUN.

After the snapshots are taken, the backup module 138 again captures the cluster node topology for validation to ensure that the process captures any change in topology since Phase 1 of the backup operation was initiated. These changes may be due to hardware failure or any other type of failure. If there is a difference between the topologies before and after the snapshots, the process starts again until snapshots are captured with a stable topology, i.e. there is no change in the topology before and after the snapshots are taken. The stable topology information is stored with the backup metadata and the snapshots.

Thereafter, in block B174, the balancer module 133 is restarted to enable any user induced changes.

Figure 1G:
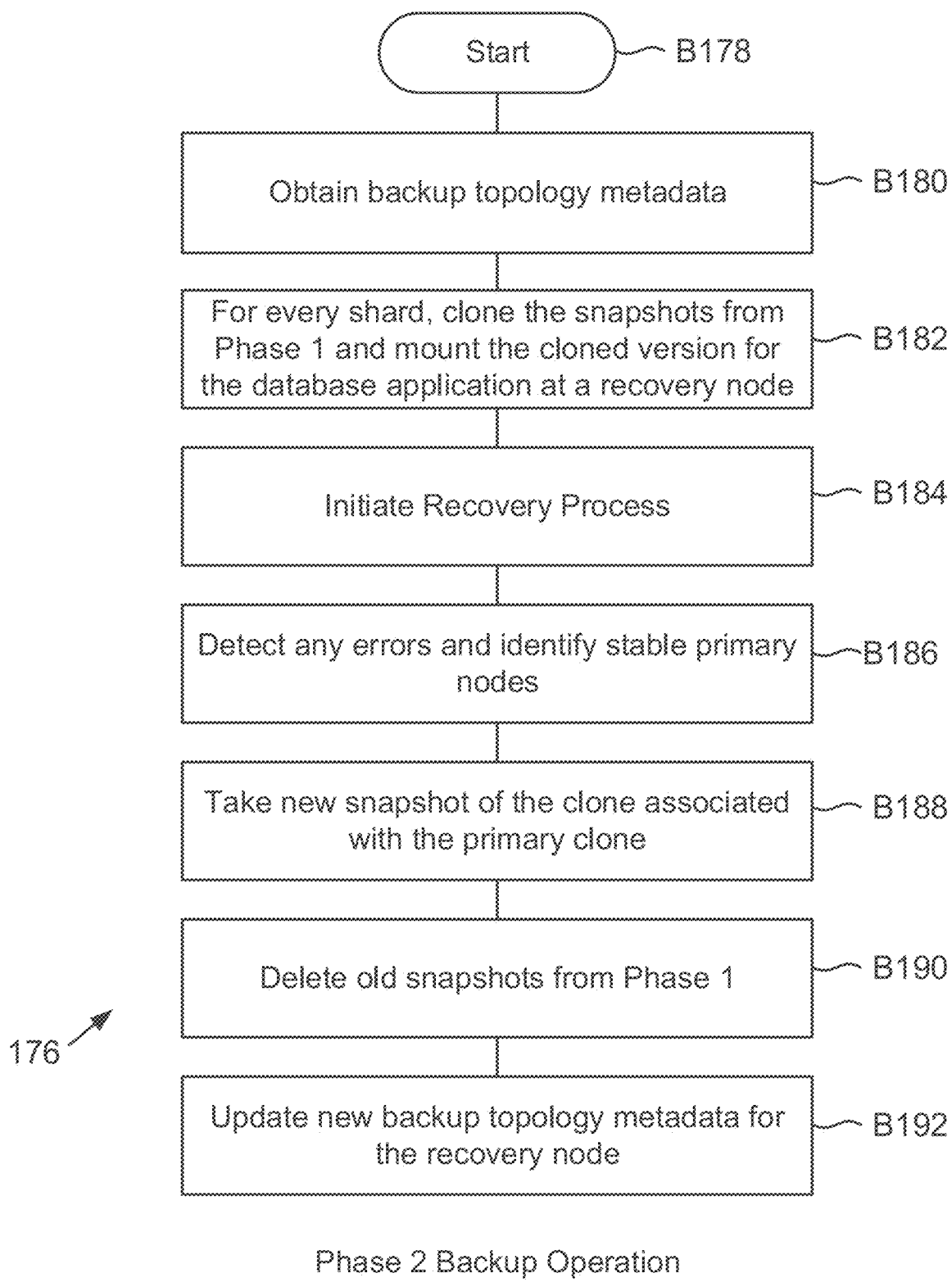
FIG. 1G shows a process flow diagram for Phase 2 of the backup operation, according to one aspect of the present disclosure.
Figure 1H:
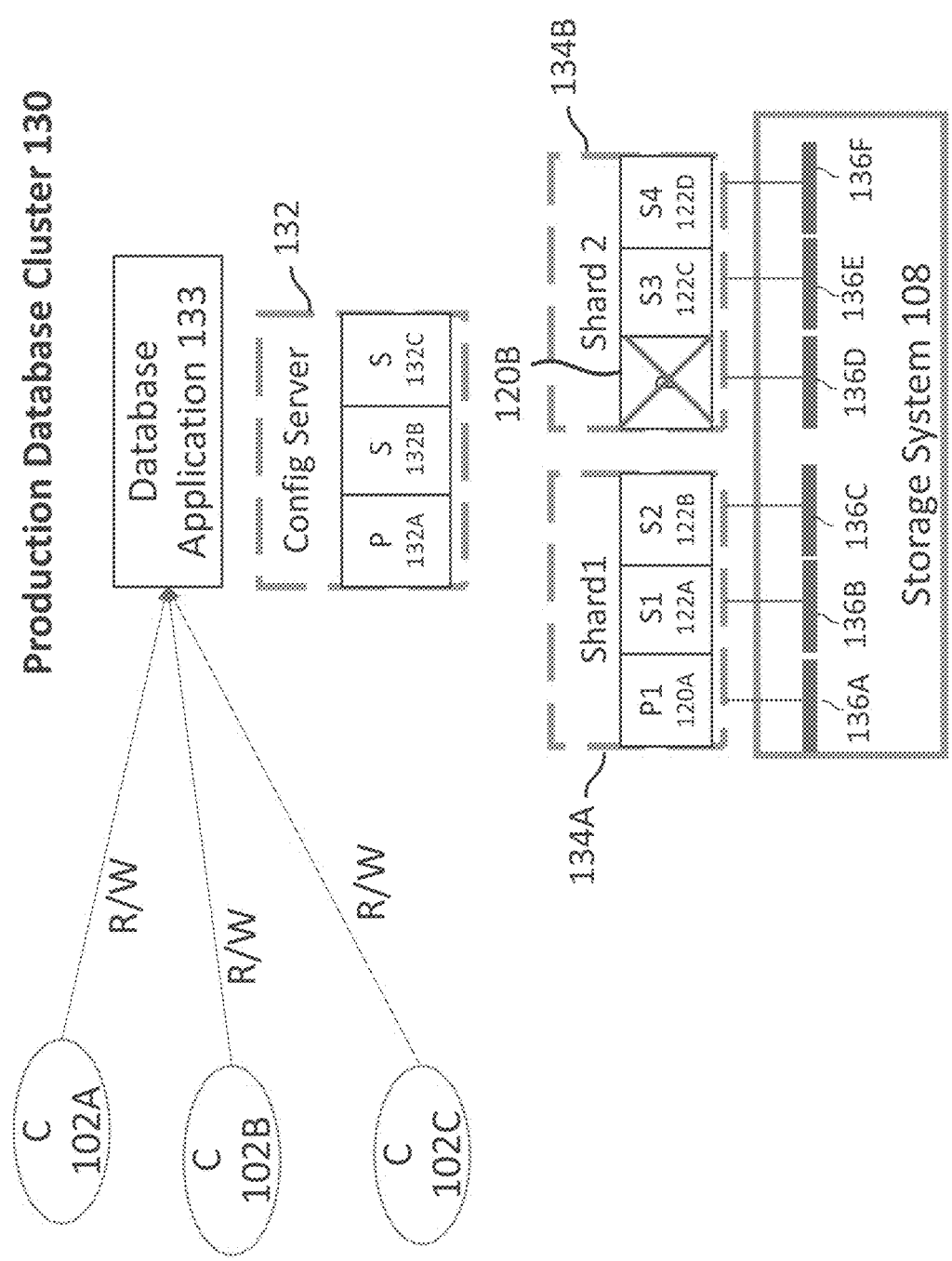
FIG. 1H shows an example of a distributed database cluster where a node becomes unavailable during a backup operation, according to one aspect of the present disclosure.
Figure 11:
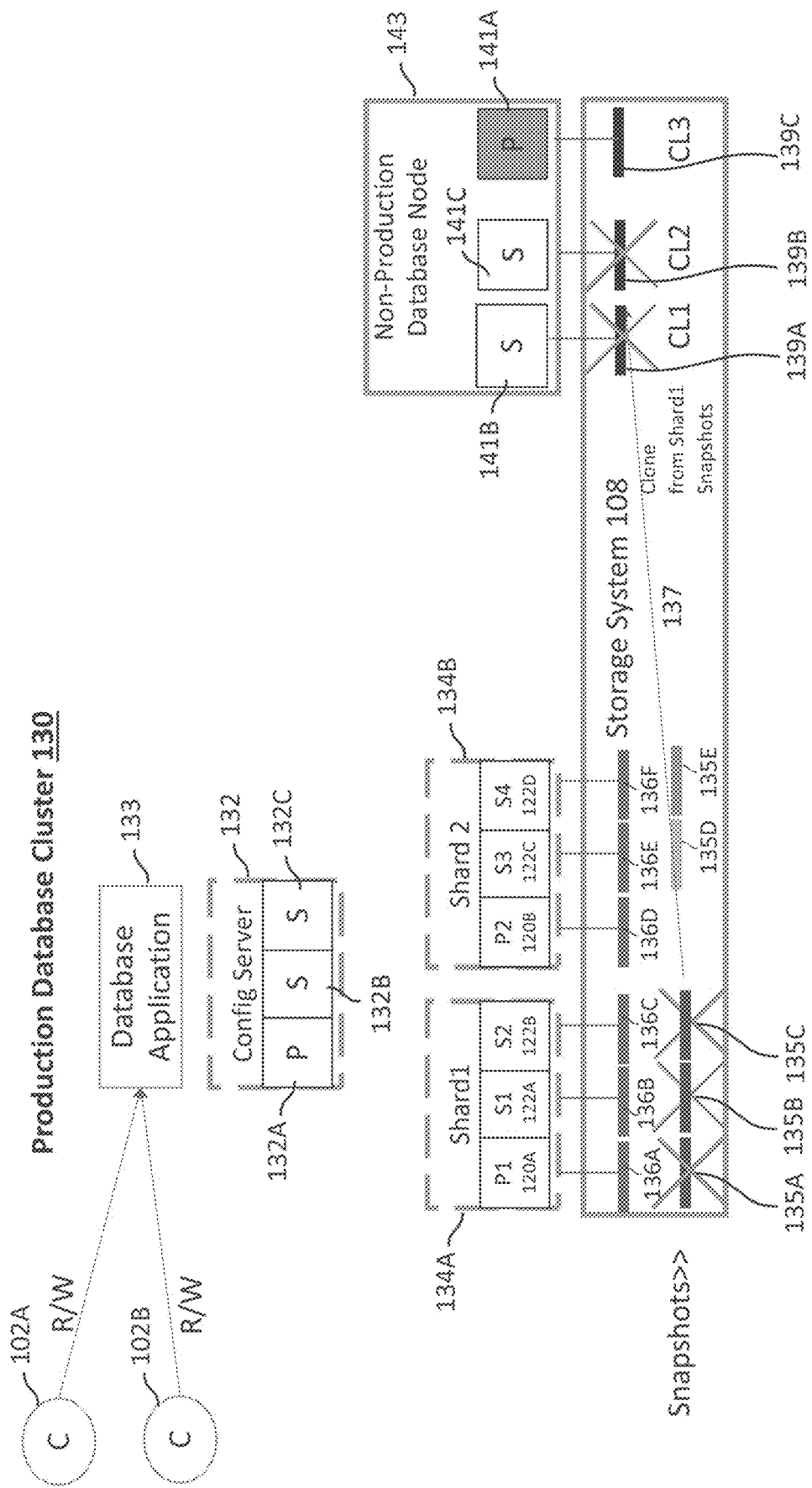

Phase 2:

FIG. 1G shows a process flow 176 for executing Phase 2 of the backup operation, according to one aspect of the present disclosure. Process blocks of Phase 2 are executed by module 150 and cluster 130 components, according to one aspect of the present disclosure.

As an example, Phase 2 maybe executed at one or more recovery nodes (computing devices/VMs) separate from the production cluster nodes. During Phase 2, module 150 iterates over each shard as captured in the topology of Phase 1. All the snapshots from Phase 1 are cloned. The cloned LUNs are then mounted for database application 133 at the recovery node.

The database application 133 then performs background tasks, e.g., checkpoint, recovery (if needed) and other steps. Checkpoint involves flushing any uncommitted operations from a journal log to data files for the database. The recovery process involves detecting (or selecting) a stable primary node within the shard and ensures that the primary node has the latest copy of all the data within the shard. Thereafter, a new snapshot is created for the modified LUN corresponding to the primary node in each shard. The backup metadata is updated to point to the snapshot for any restore workflows. The snapshots from Phase 1 are then deleted resulting in space efficiency. Thus, Phase 2 transforms the crash consistent backup to a cluster consistent state. Details of Phase 2 are now provided with respect to FIGS. 1H, 1I and 1J.

Phase 2 begins in block B178, after Phase 1 has been executed, as described above with respect to FIG. 1F. In block B180, module 150 (FIG. 1E) retrieves the backup metadata that was stored in process block B172 of Phase 1 (FIG. 1F). The backup metadata is stored at a storage location that is accessible to module 150.

In block B182, the snapshot LUNs from Phase 1 are cloned. The cloned version of the snapshot copy typically shares data blocks with the snapshot copy of a virtual block number (vbn) space maintained by a storage operating system to store the information. A data block in the vbn is typically mapped to a storage device block number in a storage device block number (dbn) space for storing information.

Figure 1J:
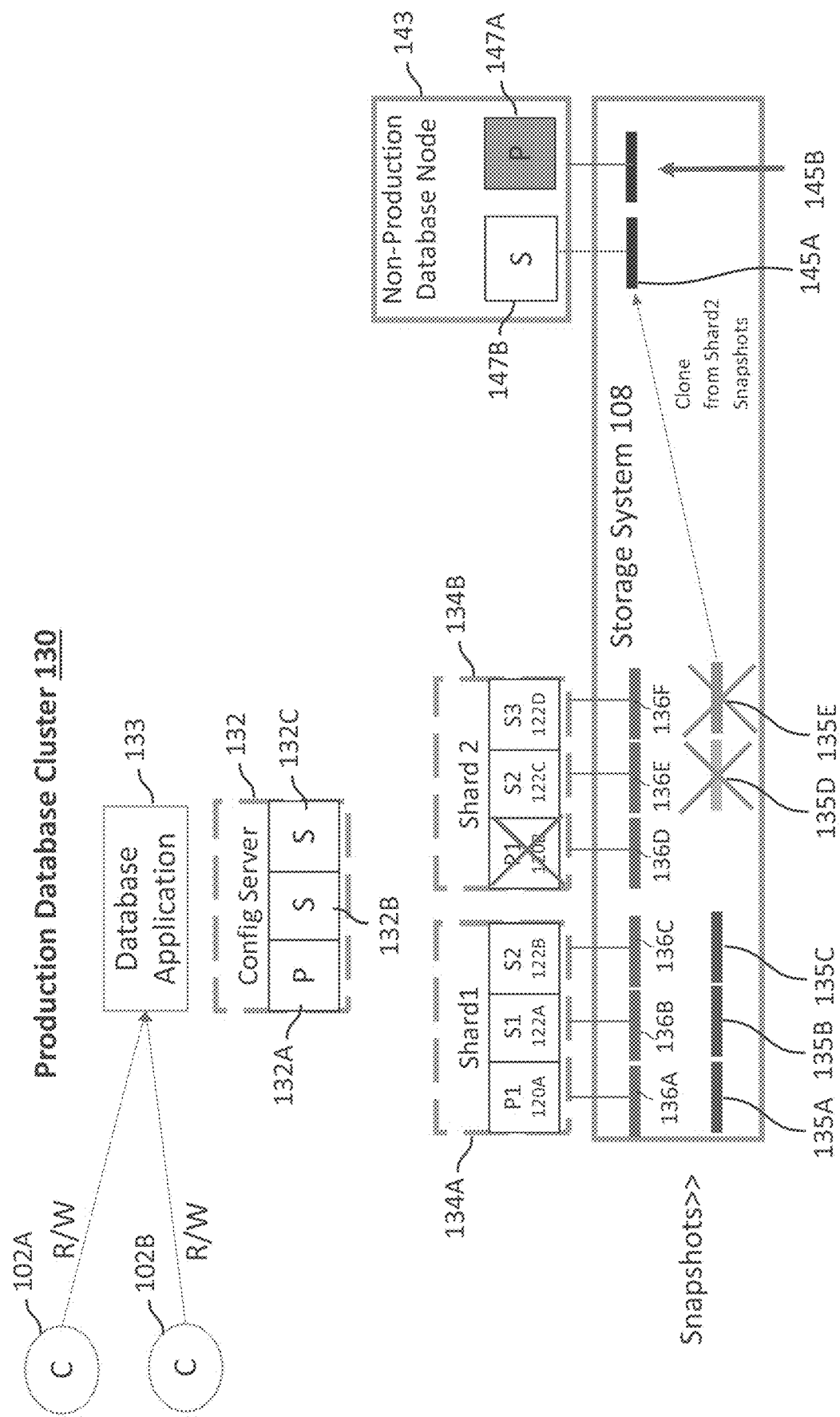
FIG. 1J shows an example of the Phase 2 of the backup operation for handling the node failure of FIG. 1H.

The number of clones will depend on the cluster topology and the health of the nodes. For example, with reference to FIG. 1I, snapshots 135A, 135B and 135C are cloned and shown as 139A, 139B and 139C, respectively. FIG. 1J shows that snapshots 135D and 135E are cloned and are shown as 145A and 145B. The cloned LUNs are then mounted at the recovery node 143 that is different from production cluster 130 nodes.

The recovery process is then initiated in block B184. In block B186, the database application 133 executed at the recovery node 143 performs checkpoint and recovery operations. Checkpoint operations involve flushing any uncommitted operations from the journal log to data files for the database. The recovery process involves detecting (or selecting) a stable primary node within the shard and ensures that the primary node has the latest copy of all the data within the shard. Any "blacklisted" databases are also dropped. A blacklisted database is a database that a user may have excluded from a backup policy. A stable primary node is detected by the database application 133 instance executed by the recovery node 143.

FIG. 1I shows an example of the recovery process for shard 1 134A. When clones 139A, 139B and 139C are mounted, assume that the database application 133 detects an error in the journal log of clone 139A, which is the clone of snapshot 135A taken for the primary LUN 136A. The database application, then elects node 141A as a primary node using clone 139C as the primary clone for the recovery node 143.

FIG. 1J shows clones 145A and 145B of snapshots 135D and 135E, respectively. In this case, the database application 133 elects node 147A (corresponding to node 122D of shard 1 134B) as the primary node. Thus clone 145B becomes the primary clone for the post-processing.

In block B188, a new snapshot of only the clone associated with the stable primary node is taken. For example, with respect to FIG. 1I, since node 141A is the primary node, then clone 139C becomes the primary, healed clone. A new snapshot (not shown) is taken of clone 139C. The new snapshot can be cloned for the secondary nodes 141B and 141C during a restore process described below.

With respect to FIG. 1J and shard 134B, since node 147A was elected as the primary node, only a snapshot of clone 145B is taken for the primary node 147A. A clone of the new snapshot can also be made available for the secondary node 147B during a restore process.

In block B190, the older snapshots from Phase 1 are all deleted. Once again this will depend on the topology. For example, with respect to FIG. 1I, snapshots 135A-135C and clones 139A-139B are deleted. Only clone 139C and its snapshots are used by node 143. With respect to FIG. 1J, snapshots 135D and 135E from Phase 1 are deleted and the snapshot of clone 145A is retained by node 143.

Thereafter, in block B192, the backup metadata for the recovery node is updated to reflect the topology of the recovery node. For example, with respect to FIG. 1I, the backup metadata identifies the primary node 141A. While in FIG. 1J, the backup metadata identifies the primary node 147A. The metadata for the recovery node 143 points to the new snapshots taken in block B188. An example of the backup metadata is provided below. This example does not include the configuration server 132 information for simplicity.

```
{
    "backup_name": 1489337713.819096,
    "blacklisted_dbs": [
        "foo_db"
    ],
    "cluster_name": "barns_mongo_clus1",
    "shards": [
        {
            "_id": "rs0",
            "members": [
                {
                    "health": 1.0,
                    "host": "10.225.169.124:27017",
                    "lun": "/vol/barns_vol_1/data_lun1_14893754300",
                    "snap": "barns_snap_2017-03-13_08:56:20.898234",
                    "stateStr": "PRIMARY"
                }
            ]
        },
        {
            "_id": "rs1",
            "members": [
                {
                    "health": 1.0,
                    "host": "10.225.169.124:27019",
                    "lun" : "/vol/barns_vol_6/data_lun6_14893756080",
                    "snap": "barns_snap_2017-03-13_08:58:32.634968",
                    "stateStr": "PRIMARY"
                }
            ],
        }
    ]
}
...
```

As shown above, the metadata includes a backup name, the blacklisted databases, and a database cluster name. The metadata identifies each shard, the health of each shard, the snapshot identifier of the final backup taken in block B188, the primary node identifier (i.e. host identifier), and the LUN identifier for the primary node. It is noteworthy that the metadata above is only for the primary node because the snapshots from Phase 1 are deleted.

Figure 1K:
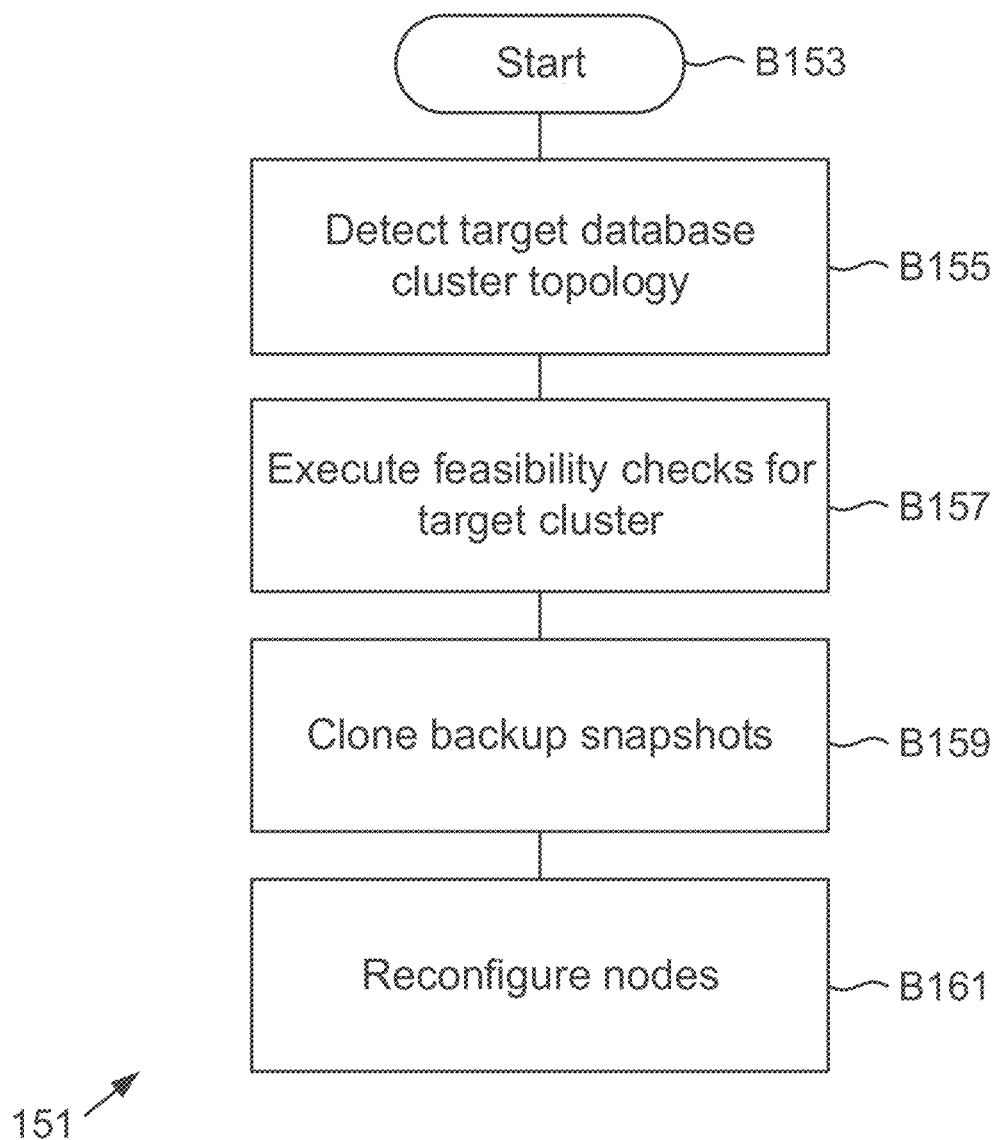
FIG. 1K shows a restore process using the cluster consistent backup, according to one aspect of the present disclosure.
Figure 1L:
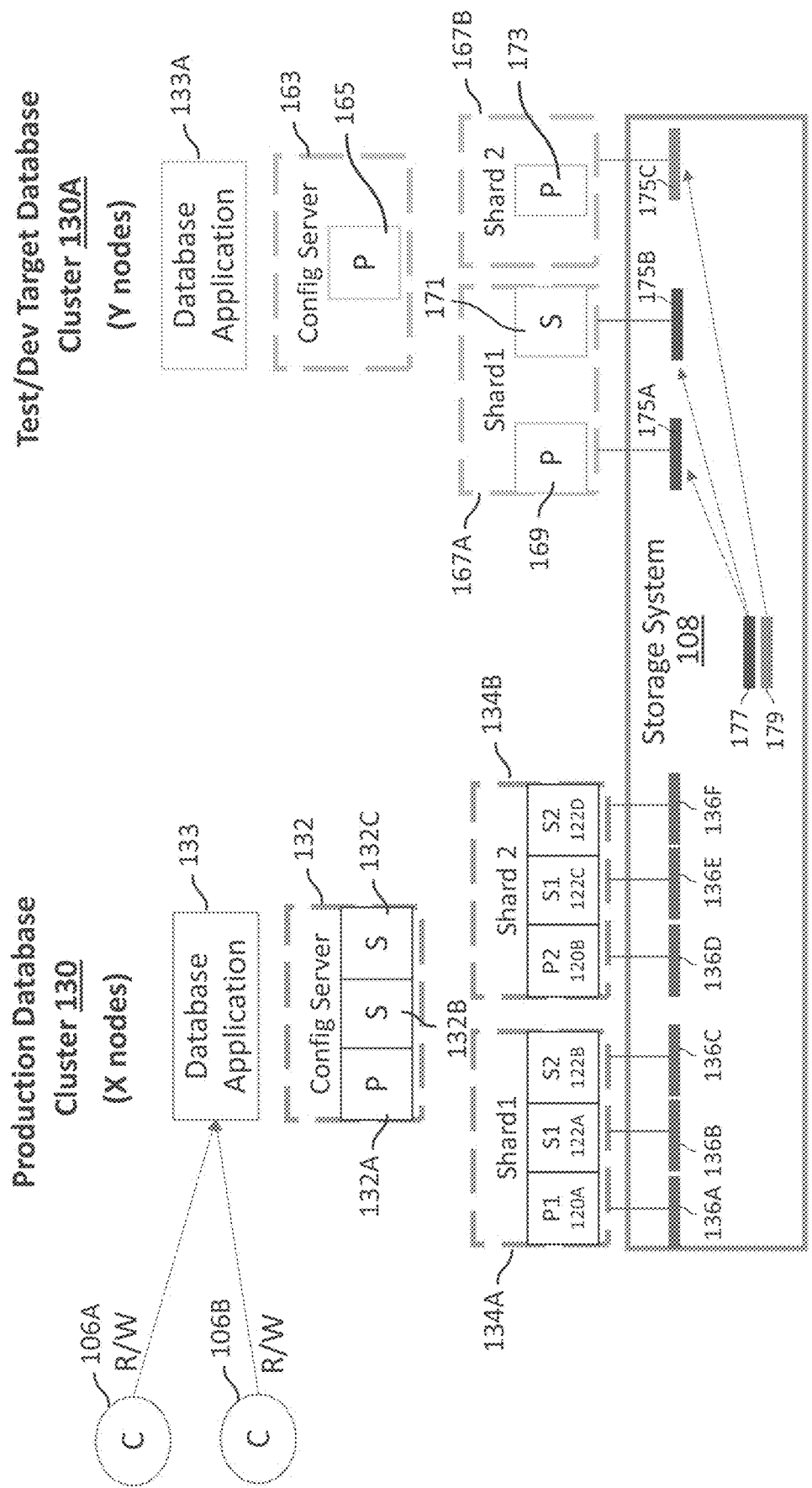
FIG. 1L shows an example of the restore process of FIG. 1K, according to one aspect of the present disclosure.

Restore Process Flows:

FIG. 1K shows a restore process 151, according to one aspect of the present disclosure with respect to the example shown in FIG. 1L. In one aspect, the restore cluster topology may not be the same as the production database cluster topology i.e. the restore cluster topology may have more or fewer nodes than the production database cluster. When the number of shards in the restore cluster are the same as production database cluster, then the snapshot for the primary node can be cloned and made available to the database application. If there are more than one node within the shards, then the snapshot of the primary node created in Phase 2 as identified in the metadata above is cloned for the various secondary nodes.

When the number of shards in the restore cluster are different from the number of shards in the backed up topology, then the shards can be added or removed to match up the backed up topology.

Referring now to FIG. 1L, the production cluster 130 is shown next to a target or test/development cluster 130A (i.e. the restore cluster). The number of nodes in the two clusters is different. For example, the production cluster 130 may include 10 different nodes (e.g. 133, 132A-132C, 120A-120B, and 122A-22D), while the target cluster may include 5 nodes (e.g. 133A, 165, 169, 171 and 173).

The process begins in block B153. In block B155, the restore module 152 first detects the target cluster topology. As shown in FIG. 1L, the target cluster includes shard 1 167A and shard 2 167B. The restore module 152 performs a feasibility check for the target cluster in block B157. This ensures that the target cluster 130A shards have the same identifiers as the production cluster shards 134A and 134B.

In block B159, the snapshots of the primary nodes from Phase 2 of the backup process are cloned for the primary and secondary nodes of the target cluster. In FIG. 1L, the primary snapshot/metadata from Phase 2 are shown as 177 and 179. Snapshot 177 is cloned as 175A and 175B for nodes 169 and 171 of shard 167A. Snapshot 179 is cloned as 175C for node 173 of shard 167B. The cloned snapshots are reconfigured to match the target cluster topology in block B161. It is noteworthy that cloning snapshots is faster and more efficient than copying all the data for different nodes. Thereafter, the target cluster is ready for testing and deployment.

In one aspect, methods and systems for a distributed database cluster are provided. The cluster includes a plurality of logical partitions, each partition stores a plurality of replicas for a database, and each replica is managed by one of a plurality of nodes of the plurality of logical partitions. One method includes capturing a topology of the distributed database cluster prior to a first backup phase of a backup operation; generating a snapshot of all logical objects used by all active nodes of the plurality of logical partitions to store the plurality of replicas of the database; verifying that the captured topology and a topology of the distributed database cluster after the snapshot of the logical objects is same; initiating a second phase of the backup operation at a recovery node using the backup topology metadata after the first phase of the backup operation; and cloning snapshots of logical objects from the first phase of the backup operation.

The method further includes capturing a snapshot of clones for primary logical objects of primary nodes of the logical partitions defined by the backup topology metadata; deleting snapshots from the first phase of the backup operation and updating a backup topology metadata for the recovery node.

For a restore process, the method includes detecting a target distributed database cluster topology for a restore operation; executing a feasibility check such that logical partition identifiers of the target distributed database cluster and the distributed database cluster are same; and cloning snapshots from the second phase of the backup operation based on a configuration of the target distributed database cluster.

The backup and restore processes and the associated innovative computing technology described above have various advantages. For example, cluster consistent backups are taken without quiescing the database application or involving cluster node communication for removing inconsistencies. A production cluster is efficiently restored to a target cluster with a different topology. This occurs while I/O requests are being processed and the database application 133 is not quiesced. Because Phase 1 snapshots are all deleted, the shared storage space of system 108 is used efficiently.

Figure 2A:
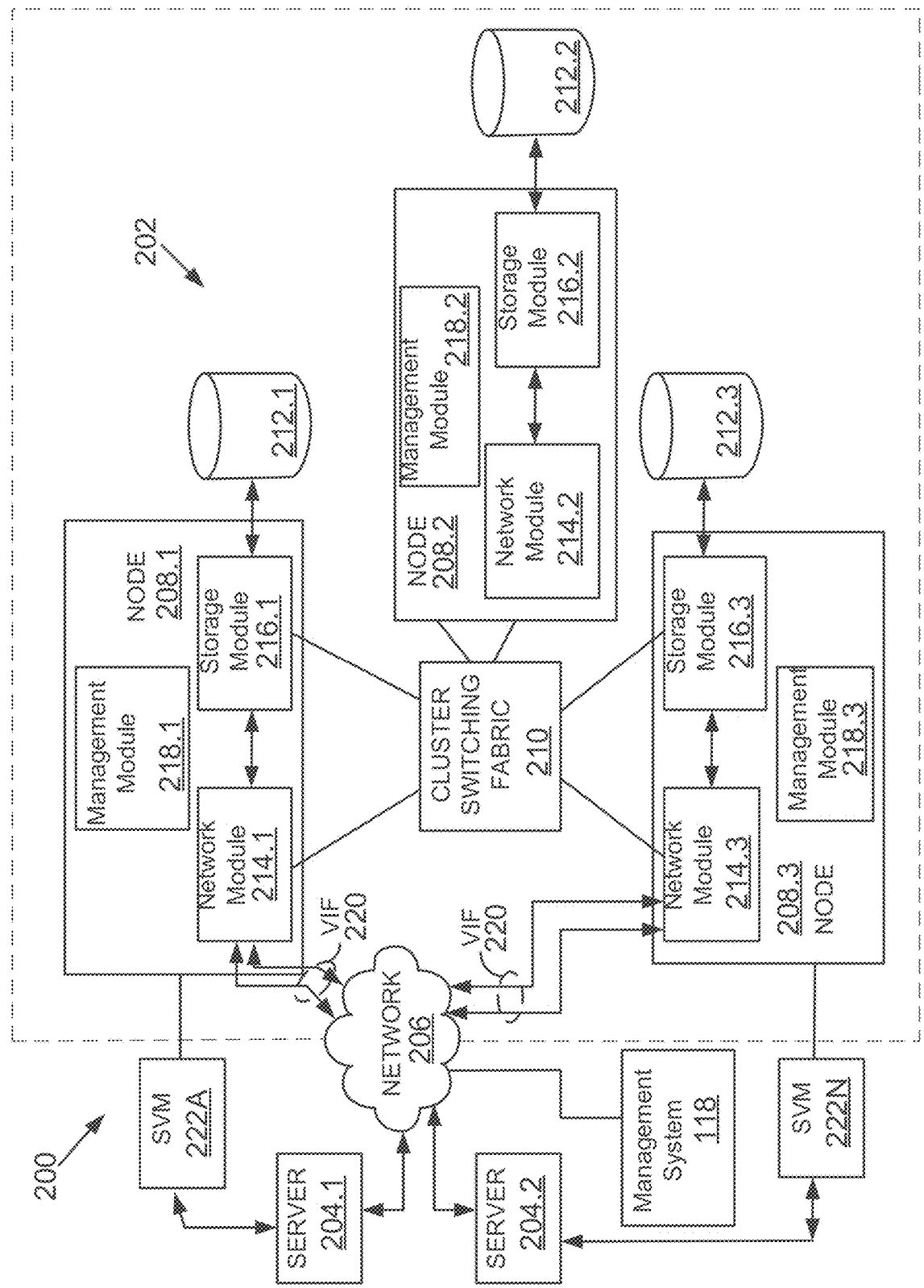
FIG. 2A shows an example of a clustered storage system, according to one aspect of the present disclosure.

Clustered Storage System:

FIG. 2A depicts an illustrative aspect of a shared, storage environment 200 used by the database cluster 130. The shared, storage environment 200 includes a plurality of server systems 204.1-204.2 (similar to server systems 104), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 110, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3. It is noteworthy that the storage system 202 nodes are different and separate from the distributed database cluster nodes described above.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
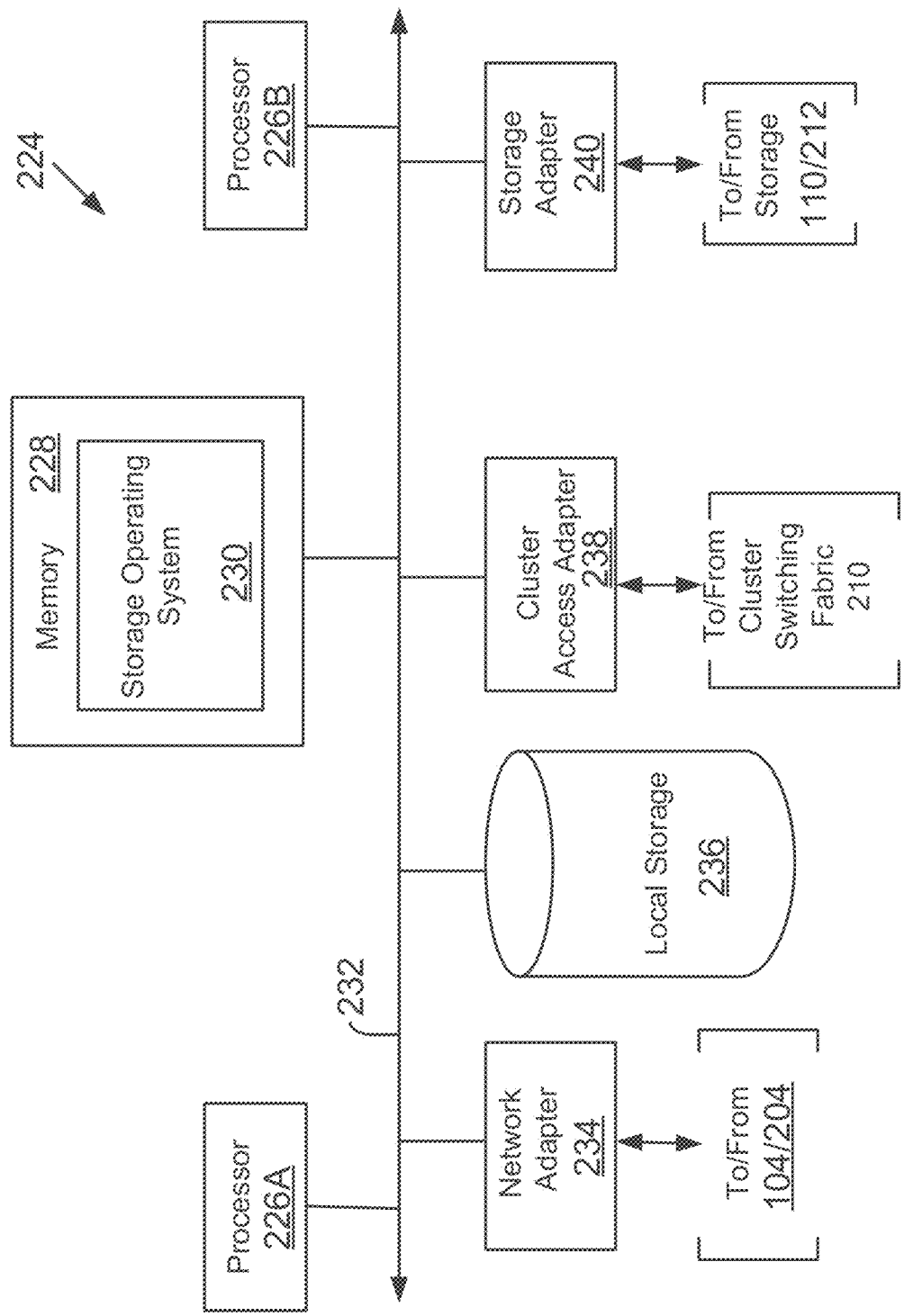
FIG. 2B shows an example of a storage system node, used according to one aspect of the present disclosure.

Storage System Node:

FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
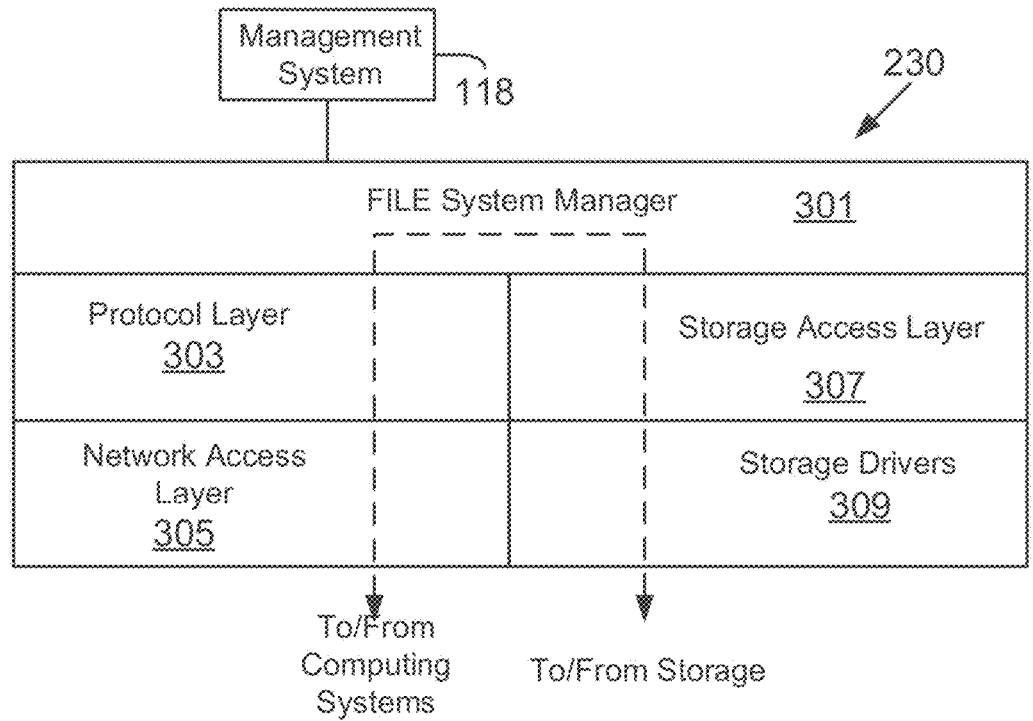
FIG. 3 shows an example of a storage operating system, used according to one aspect of the present disclosure.

Operating System:

FIG. 3 illustrates a generic example of operating system 230 executed by storage system 108, according to one aspect of the present disclosure. Storage operating system 230 interfaces with the management system 118 for backing up and cloning LUNs, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 104 and mass storage devices 110/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
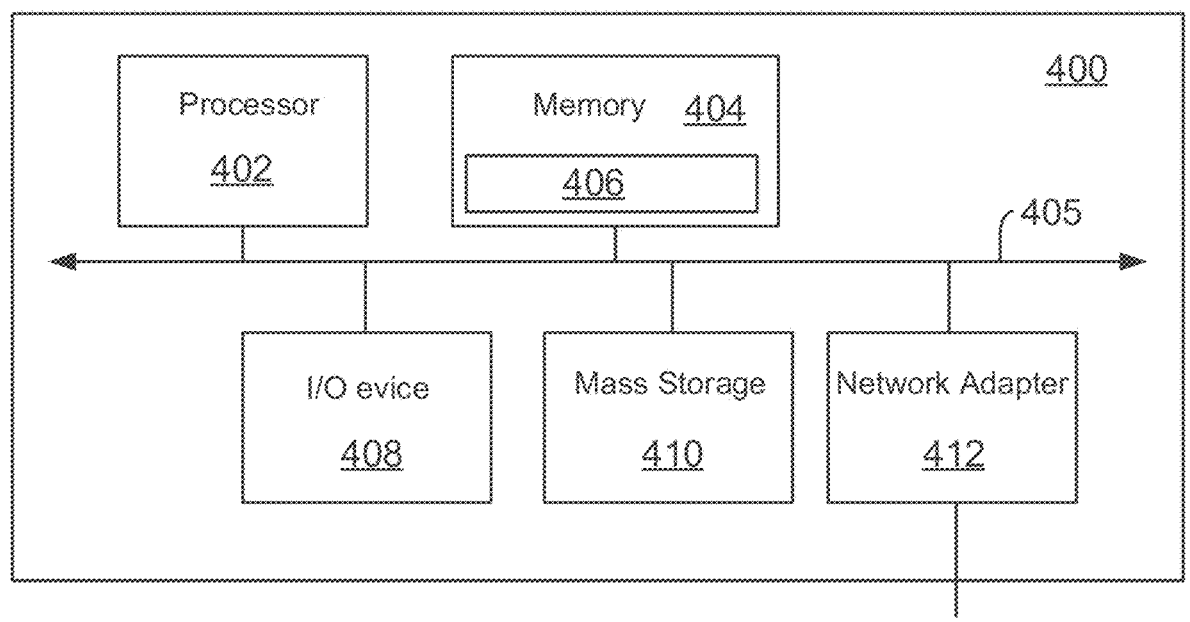
FIG. 4 shows an example of a processing system, used according to one aspect of the present disclosure.

Processing System:

FIG. 4 is a high-level block diagram showing an example of the architecture of a processing system, at a high level, in which executable instructions as described above can be implemented. The processing system 400 can represent modules of management system 118, user console 102, server systems 104 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by the backup module 138 as well as instructions for executing the process blocks of FIGS. 1F, 1G and 1K.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118 (and associated methods thereof) and storage systems described above can be a part of the server layer for providing storage services. Details regarding these layers are not germane to the inventive aspects.

Thus, a method and apparatus for protecting master-slave, distributed databases have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method for a distributed database cluster having a plurality of logical partitions, each logical partition stores a plurality of replicas of a database, and each replica is managed by a computing node from a plurality of computing nodes, the computing nodes storing the plurality of replicas for each logical partition at a storage system node, comprising;

detecting active computing nodes of the logical partitions for a first phase of a backup operation to backup the database at the distributed database cluster;

capturing a topology of the distributed database cluster for the first phase, the topology indicating a mapping between the active computing nodes and corresponding logical partitions, and mapping between logical objects and the active computing nodes, the logical objects used by the active computing nodes to store replicas at storage system nodes;

generating a snapshot of the logical objects used by the active computing nodes for the first phase and storing metadata associated with the snapshot;

verifying that the captured topology and a topology of the distributed database cluster is same after the snapshot is generated; and upon verification, using the metadata from the first phase for a second phase of the backup operation at a recovery computing node to clone the snapshot of the logical objects from the first phase.

2. The method of claim 1, further comprising:

capturing for the second phase, a snapshot of clones of primary logical objects of primary computing nodes of the logical partitions defined by the metadata; wherein a primary node of each logical partition is an active computing node that receives write and read requests associated with the database; and deleting snapshots from the first phase of the backup operation.

3. The method of claim 2, further comprising:

updating topology metadata for the recovery node indicating a logical partition associated with the recovery node, the topology metadata pointing to snapshot of clones taken during the second phase.

4. The method of claim 1, further comprising:

detecting a target distributed database cluster topology for a restore operation; and executing a feasibility check such that logical partition identifiers of the target distributed database cluster and the distributed database cluster are same.

5. The method of claim 4, wherein the target distributed database cluster topology is different from a topology of the distributed database cluster.

6. The method of claim 4, wherein the target distributed database cluster topology is same as a topology of the distributed database cluster.

7. The method of claim 4, further comprising:

cloning snapshots from the second phase of the backup operation based on a configuration of the target distributed database cluster.

8. A non-transitory, machine-readable storage medium having stored thereon instructions for performing a method for a distributed database cluster having a plurality of logical partitions, each logical partition stores a plurality of replicas of a database, and each replica is managed by a computing node from a plurality of computing nodes, the computing nodes storing the plurality of replicas for each logical partition at a storage system node, comprising machine executable code which when executed by at least one machine, causes the machine to:

detect active computing nodes of the logical partitions for a first phase of a backup operation to backup the database at the distributed database cluster;

capture a topology of the distributed database cluster for the first phase, the topology indicating a mapping between the active computing nodes and corresponding logical partitions, and mapping between logical objects and the active computing nodes, the logical objects used by the active computing nodes to store replicas at storage system nodes;

generate a snapshot of the logical objects used by the active computing nodes for the first phase and storing metadata associated with the snapshot;

verify that the captured topology and a topology of the distributed database cluster is same after the snapshot is generated; and upon verification, use the metadata from the first phase for a second phase of the backup operation at a recovery computing node to clone the snapshot of the logical objects from the first phase of the backup operation.

9. The non-transitory machine-readable storage medium of claim 8, the machine executable code further causing the machine to:

capture for the second phase, a snapshot of clones of primary logical objects of primary computing nodes of the logical partitions defined by the metadata; wherein a primary node of each logical partition is an active computing node that receives write and read requests associated with the database; and delete snapshots from the first phase of the backup operation.

10. The non-transitory machine-readable storage medium of claim 9, the machine executable code further causing the machine to:

update topology metadata for the recovery node indicating a logical partition associated with the recovery node, the topology metadata pointing to snapshot of clones taken during the second phase.

11. The non-transitory machine-readable of claim 8, the machine executable code further causing the machine to:

detect a target distributed database cluster topology for a restore operation; and execute a feasibility check such that logical partition identifiers of the target distributed database cluster and the distributed database cluster are same.

12. The non-transitory machine-readable of claim 11, wherein the target distributed database cluster topology is different from a topology of the distributed database cluster.

13. The non-transitory machine-readable of claim 11, wherein the target distributed database cluster topology is same as a topology of the distributed database cluster.

14. The non-transitory machine-readable of claim 11, the machine executable code further causing the machine to:

clone snapshots from the second phase of the backup operation based on a configuration of the target distributed database cluster.

15. A system, comprising:

a memory containing machine readable medium comprising machine executable code having stored thereon instructions; and a processor module coupled to the memory, the processor module configured to execute the machine executable code to:

detect active computing nodes of logical partitions of a distributed database cluster for a first phase of a backup operation to backup a database at the distributed database cluster;

wherein the distributed database cluster includes a plurality of logical partitions, each logical partition stores a plurality of replicas of the database, and each replica is managed by a computing node from a plurality of computing nodes, the computing nodes storing the plurality of replicas for each logical partition at a storage system node capture a topology of the distributed database cluster for the first phase, the topology indicating a mapping between the active computing nodes and corresponding logical partitions, and mapping between logical objects and the active computing nodes, the logical objects used by the active computing nodes to store replicas at storage system nodes generate a snapshot of the logical objects used by the active computing nodes for the first phase and storing metadata associated with the snapshot;

verify that the captured topology and a topology of the distributed database cluster is same after the snapshot is generated; and upon verification, use the metadata from the first phase for a second phase of the backup operation at a recovery computing node to clone the snapshot of the logical objects from the first phase.

16. The system of claim 15, the machine executable code further causing the machine to:
capture for the second phase, a snapshot of clones of primary logical objects of primary computing nodes of the logical partitions defined by the metadata; wherein a primary node of each logical partition is an active computing node that receives write and read requests associated with the database; and
delete snapshots from the first phase of the backup operation.

17. The system of claim 16, the machine executable code further causing the machine to:
update topology metadata for the recovery node indicating a logical partition associated with the recovery node, the topology metadata pointing to snapshot of clones taken during the second phase.

18. The system of claim 15, the machine executable code further causing the machine to:
detect a target distributed database cluster topology for a restore operation; and
execute a feasibility check such that logical partition identifiers of the target distributed database cluster and the distributed database cluster are same.

19. The system of claim 18, wherein the target distributed database cluster topology is different from a topology of the distributed database cluster.

20. The system of claim 18, the machine executable code further causing the machine to:
clone snapshots from the second phase of the backup operation based on a configuration of the target distributed database cluster.

* * * * *